Jan. 29, 1924.

W. B. MANN, SR 1,482,023

BOLL WEEVIL MACHINE

Filed July 31, 1923

Inventor
W. B. Mann Sr.
By C. A. Snow & Co.
Attorneys

Jan. 29, 1924.
W. B. MANN, SR
1,482,023
BOLL WEEVIL MACHINE
Filed July 31, 1923
2 Sheets-Sheet 2
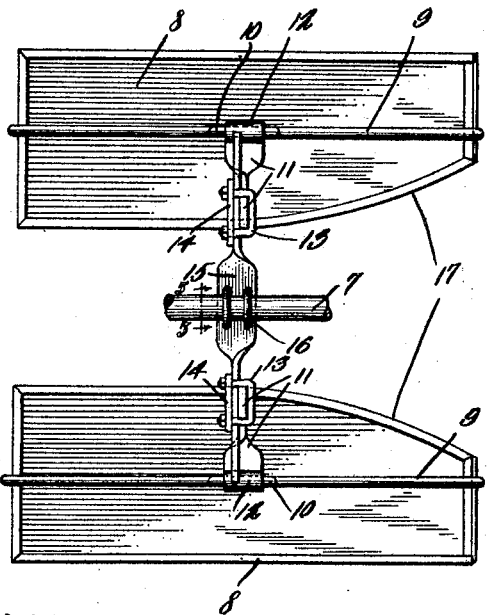
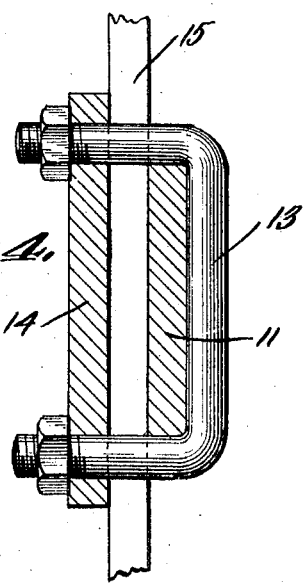
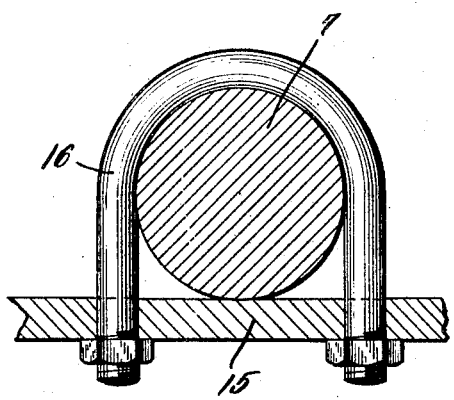
W. B. Mann, Sr
Inventor.
By C. A. Snow & Co.
Attorneys Patented Jan. 29, 1924.

1,482,023

UNITED STATES PATENT OFFICE.

WILLIAM B. MANN, SR., OF MARIANNA, ARKANSAS.

BOLL-WEEVIL MACHINE.

Application filed July 31, 1923. Serial No. 654,879.

*To all whom it may concern:*

Be it known that I, WILLIAM B. MANN, Sr., a citizen of the United States, residing at Marianna, in the county of Lee and State of Arkansas, have invented a new and useful Boll-Weevil Machine, of which the following is a specification.

This invention has reference to a device especially designed for attachment to cultivators or the like agricultural machines.

The primary object of the invention is to provide means for destroying insects or the like that infest plant life, during the cultivating operation of the plant life.

An important object of the invention is to provide a device of this character which may be readily and easily mounted on the usual cultivator frame construction, and one wherein the pans, forming important features of the invention may be adjusted with respect to each other.

Another object of the invention is to provide a novel form of supporting mechanism to permit the pans to be adjusted vertically with respect to the ground surface over which the machine is operating, thereby adapting the machine for use in connection with plants of various sizes.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

Referring to the drawings:

Figure 3 is a plan view of the attachment.

Figure 4 is a sectional view taken on line 4—4 of Figure 2.

Figure 5 is a sectional view taken on line 5—5 of Figure 3.

Figure 1:
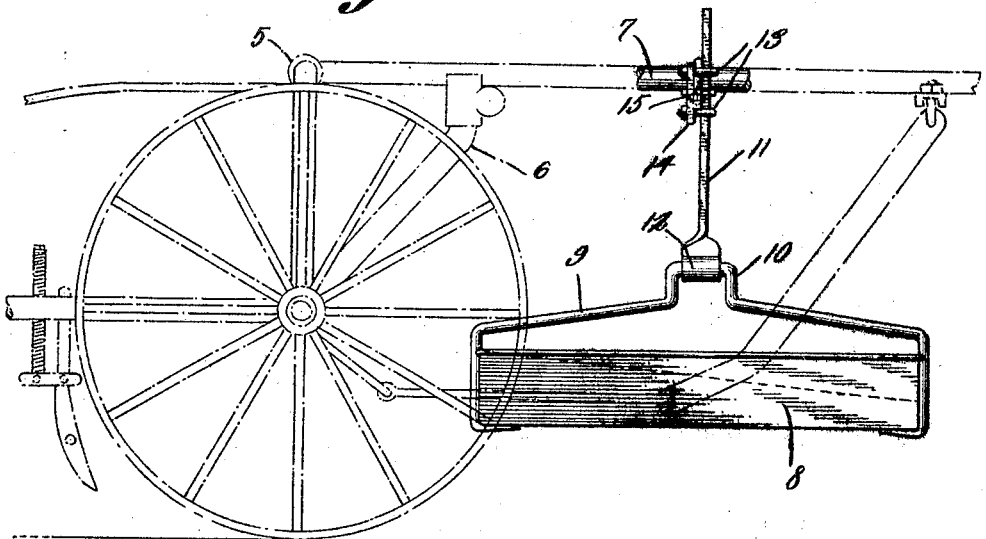
Figure 1 is a side elevational view disclosing a cultivator supplied with an insect catching device constructed in accordance with the invention.
Figure 2:
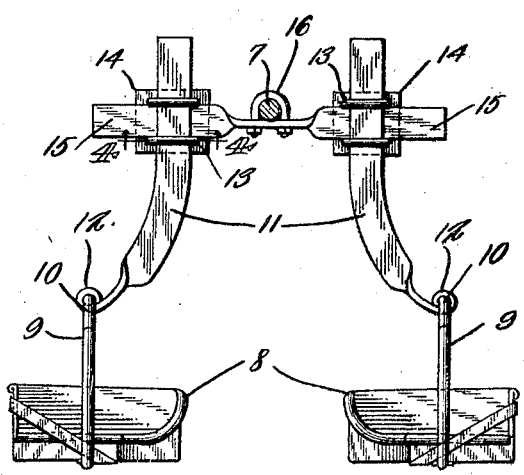
Figure 2 is a front elevational view of the attachment.

Referring to the drawings in detail, the cultivator is indicated generally by the reference character 5 and includes a frame embodying side rails 6 and a central rail 7, which in the present showing, constitutes a portion of the tongue of the cultivator.

The attachment, forming the subject matter of the invention embodies pans 8, which are formed with rigid bails 9 that extend from the forward ends of the pans to the rear ends thereof as clearly shown by Figure 1 of the drawings. Formed intermediate the ends of the bails 9 are offset portions 10 to which the curved arms 11 are connected, the lower ends of the arms 11 being formed into loop portions 12 that embrace portions of the bails.

The arms 11 are secured in position by means of the U-bolts 13 that embrace portions of the arms 11 and have connection with the plates 14, the supporting bar 15 having its ends disposed between the plates 14 and the arms 11, whereby the U-bolts 13 not only function to secure the arms in position, but at the same time secure the arms to the supporting bar 15.

As shown, the supporting bar is formed with spaced openings disposed intermediate its ends, which openings receive the U-bolt 16 that embraces a portion of the rail 7. Thus it will be seen that by moving the plates 14 towards the ends of the bar 15, the pans may be adjusted with respect to each other in horizontal planes, and that by moving the arms 11 through the U-bolts 13, the pans may be adjusted in vertical planes with respect to the ground surface insuring the efficient operation of the device in connection with plants of various sizes.

The pans are of particular constructions as clearly shown by Figure 3 of the drawings and have their forward inner walls curved as shown, at 17 so that the smooth regular surface will be presented at the forward ends of the pans to insure against the pans injuring the plants being cultivated.

In the use of the device, it might be stated that a suitable insect destroying fluid may be placed in the pans so that as the machine is moved along the rows of plants being cultivated the insects, such as boll weevil or the like will be brushed from the plants where they fall into the pans.

I claim:—

In a device of the character described, a cultivator frame, pans supported by the cultivator frame, each of said pans including a bail, said bail having offset portions, curved arms having loops formed at the lower ends thereof and adapted to accommodate the offset portions of the bails, a bar disposed above the pans, means for connecting the arms to the bar to permit of lateral and vertical adjustment of the arms and pans supported thereby.

In testimony that I claim the foregoing as my own, I have hereto affixed my signature in the presence of two witnesess.

WILLIAM B. MANN, Sr.

Witnesses:
 BURK MANN,
 R. B. McCULLOCH.